(12) United States Patent
Nonomura et al.

(10) Patent No.: US 12,338,885 B2
(45) Date of Patent: Jun. 24, 2025

(54) GEAR COMPONENT

(71) Applicant: HITACHI CONSTRUCTION MACHINERY CO., LTD., Tokyo (JP)

(72) Inventors: Kazuya Nonomura, Nishinomiya (JP); Kunihiro Fukuda, Tsukuba (JP); Yuuki Tahara, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/729,905

(22) PCT Filed: Mar. 22, 2023

(86) PCT No.: PCT/JP2023/011142
§ 371 (c)(1),
(2) Date: Jul. 18, 2024

(87) PCT Pub. No.: WO2023/182333
PCT Pub. Date: Sep. 28, 2023

(65) Prior Publication Data
US 2025/0102054 A1   Mar. 27, 2025

(30) Foreign Application Priority Data
Mar. 25, 2022   (JP) .................................. 2022-050297

(51) Int. Cl.
*F16H 55/06*   (2006.01)
(52) U.S. Cl.
CPC .................................. *F16H 55/06* (2013.01)

(58) Field of Classification Search
CPC ...................................................... F16H 55/06
See application file for complete search history.

(56) References Cited

U.S. PATENT DOCUMENTS

| 6,569,267 | B1 | 5/2003 | Nakamura et al. |
| 2005/0103777 | A1 | 5/2005 | Takayama |
| 2012/0247249 | A1* | 10/2012 | Obayashi ............. H10K 10/471 |
| | | | 148/210 |

FOREIGN PATENT DOCUMENTS

| JP | 2000-018369 A | 1/2000 |
| JP | 2001-098343 A | 4/2001 |
| JP | 2005-113168 A | 4/2005 |
| JP | 2005-163173 A | 6/2005 |

OTHER PUBLICATIONS

International Search Report of PCT/JP2023/011142 dated Jun. 13, 2023.

\* cited by examiner

*Primary Examiner* — Terence Boes
(74) *Attorney, Agent, or Firm* — MATTINGLY & MALUR, PC (57) ABSTRACT

This invention provides a gear component with high hardness of a surface layer in a tooth root and with the excellent bending fatigue strength. The gear component of the invention comprises a surface layer of a tooth root including a region in which the area percentage of carbides is 10% or lower and the number density of carbides is 6 pieces/10 μm² or lower.

3 Claims, 10 Drawing Sheets

GEAR COMPONENT

TECHNICAL FIELD

The present invention relates to a super-carburized gear component.

BACKGROUND ART

A gear, which is a component of a power transmission device as typified by a transmission, a reducer, or the like, is generally produced by molding a case hardening steel in the form of a component and subjecting the component to carburizing or carbonitriding. In recent years, downsizing and compactification of a gear aimed at cost reduction has been in progress, and, accordingly, development of a component with a higher strength has been awaited.

In order to achieve compactification, the load imposed on each gear increases. Because of the increased load, a demand for the improved durability is increasing. Techniques for improving the durability that have been known are the carburizing treatment for strengthening a component by introducing carbon into heated steel and hardening the steel at atmospheric pressure and forming a hard martensitic structure and the vacuum carburizing treatment for preventing formation of the brittle grain-boundary oxide, which becomes the starting point of fatigue fracture, by performing the carburizing treatment at reduced pressure are known. In recent years, the super-carburizing treatment for strengthening a component by introducing carbon at the eutectoid concentration or higher into steel and depositing a hard carbide in the martensitic mother phase has been adopted.

In the super-carburizing treatment, in general, the form of carbide deposition is known to influence the durability. For example, Patent Literature 1 discloses a steel component for a machine structure with the area percentage of carbides of 5% or more and the surface density of carbides with diameters of 0.5 $\mu m$ or less of 6.0 pieces/10 $\mu m^2$ or more. With the use of such component, fine carbides are diffused and deposited, and the pitting resistance of the carbides can be improved.

CITATION LIST

Patent Literature

Patent Literature 1: JP Patent Publication (Kokai) No. 2005-113168 A

SUMMARY OF INVENTION

Technical Problem

In the component disclosed in Patent Literature 1, however, the surface area at the interface between a large quantity of deposited carbides and the mother phase increases. This interface is thermodynamically unstable, and it is likely to serve as the core of pearlite transformation, bainite transformation, or the like during hardening. In addition, an alloying element, such as chromium, in the mother phase is concentrated in carbides, the concentration of the alloying element, such as chromium, is decreased in the mother phase in the vicinity of the interface, and the hardenability is then lowered. Thus, a structure, such as a pearlite or bainite structure, with hardness lower than that of the martensite is likely to be formed during hardening. Such phenomenon is likely to occur when it is applied to a gear with a large rim thickness and a large heat capacity, and such phenomenon is observed at a significant level at the tooth root where a cooling rate is particularly low. This lowers hardness of the tooth root surface layer and lowers the bending fatigue strength of the tooth root, disadvantageously. When the improved strength and the prolonged life of the entire gear are intended, in other words, attention may be paid to the tooth root in order to achieve the improved strength and the prolonged life of the gear.

In order to overcome the problems of the conventional technique, it is an object of the present invention to provide a gear component with a hard surface layer of the tooth root and the excellent bending fatigue strength.

Solution to Problem

In order to achieve the object described above, the gear component of the present invention comprises a tooth section having a tooth root, a tooth tip, and a tooth surface between the tooth root and the tooth tip and consists of a super-carburized steel material, wherein the tooth root has a carbide layer comprising carbides diffused and deposited on a surface layer, and the area percentage of carbides is 10% or lower and the number density of carbides is 6 pieces/10 $\mu m^2$ or lower in at least a part of the carbide layer of the tooth root.

The description incorporates the contents disclosed by JP Patent Application No. 2022-050297, based on which the priority of the present application claims.

ADVANTAGEOUS EFFECTS OF INVENTION

With the use of the gear component of the present invention, the area percentage of carbides is reduced, and a surface area at the interface between the carbides and the mother phase is reduced. Thus, the core for pearlite transformation, bainite transformation, or the like during hardening is reduced, an extent of a decrease in the concentration of an alloying element, such as chromium, in the mother phase is reduced in the vicinity of the interface, and an extent of lowering in hardenability is reduced. As a result, a soft structure of pearlite, bainite, or the like is less likely to be formed during hardening, hardness of the surface layer of the tooth root is improved, and the bending fatigue strength of the tooth root is improved.

DESCRIPTION OF EMBODIMENTS

Hereafter, an embodiment of the gear component according to the present invention is described with reference to the figures.

At the outset, the element composition of the gear component of the present invention is described. The gear component comprises various alloying elements with the balance consisting of a steel material comprising Fe and unavoidable impurities. Specifically, the gear component can be composed of a material, such as Cr steel (SCr material), Cr-Mo steel (SCM material), or Ni-Cr-Mo steel (SNCM material), as defined in, for example, JIS G4053.

Figure 1:
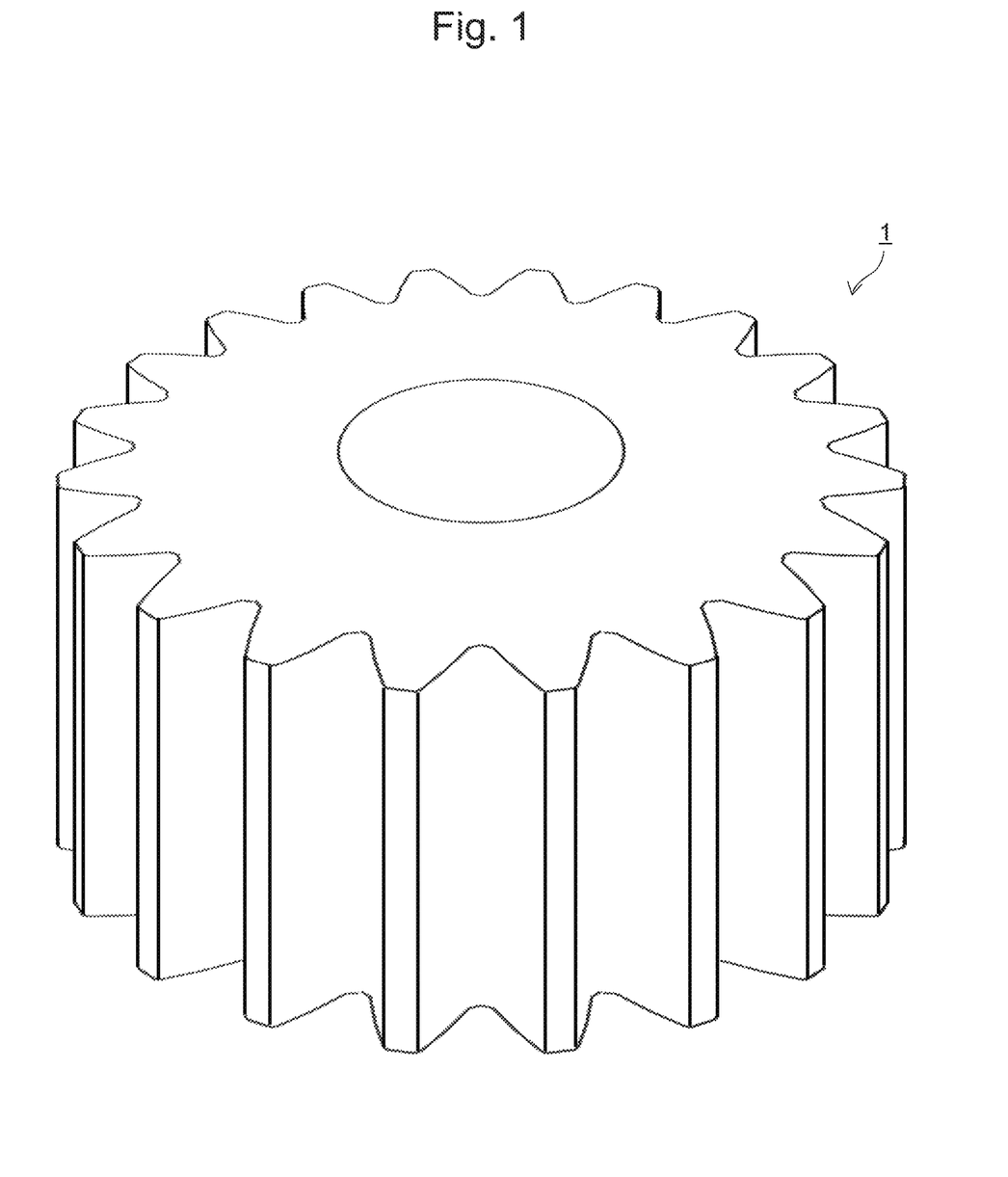
FIG. 1 is a perspective view demonstrating an embodiment of the gear component according to the present invention.

FIG. 1 is a perspective view demonstrating the gear component according to an embodiment of the present invention. The gear component 1 can be used as a gear for a construction machine, such as a hydraulic shovel or dump truck, although the application thereof is not limited thereto.

Figure 2:
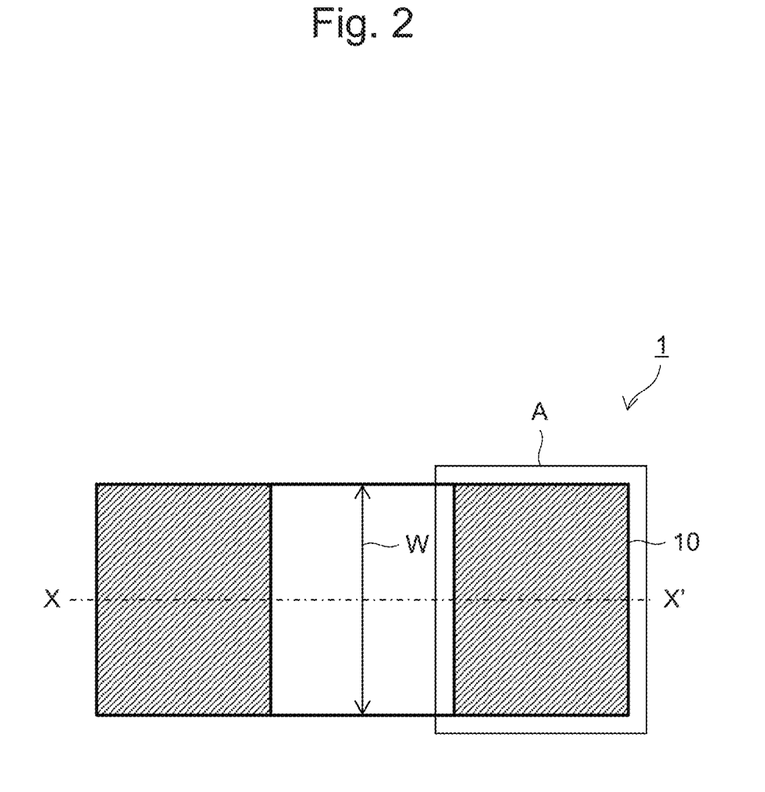
FIG. 2 is an axial cross sectional view of the gear component according to an embodiment of the present invention.
Figure 3:
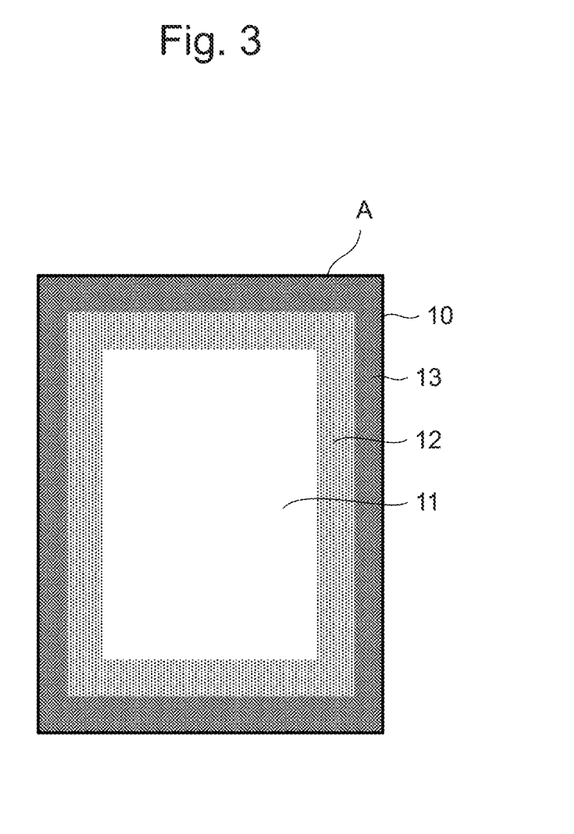
FIG. 3 is an enlarged view of a part A shown in FIG. 2.

FIG. 2 is an axial cross sectional view of the gear component 1, and FIG. 3 is an enlarged view of a part A shown in FIG. 2 that schematically shows an axial cross section of the gear component 1. As a result of the super-carburizing treatment, the gear component 1 has an internal structure comprising a mother phase 11, a carburized layer 12, and a carbide layer 13 formed in that order from the core part toward the surface 10. In the carburized layer 12, carbon concentration is higher than that in the mother phase 11. In the carburized layer 12, carbon concentration is particularly high in the carbide layer 13, which is a layered region where carbides are diffused and deposited. The super-carburizing treatment can be referred to as a carburizing treatment that forms the carbide layer 13 as described above (i.e., the super-carburizing treatment is performed, so as to allow carbides to precipitate in a region near the surface). The carburized layer 12 and the carbide layer 13 can be collectively referred to as a layer with higher carbon concentration than that in the mother phase 11 (i.e., the carburizing treatment layer).

Figure 4:
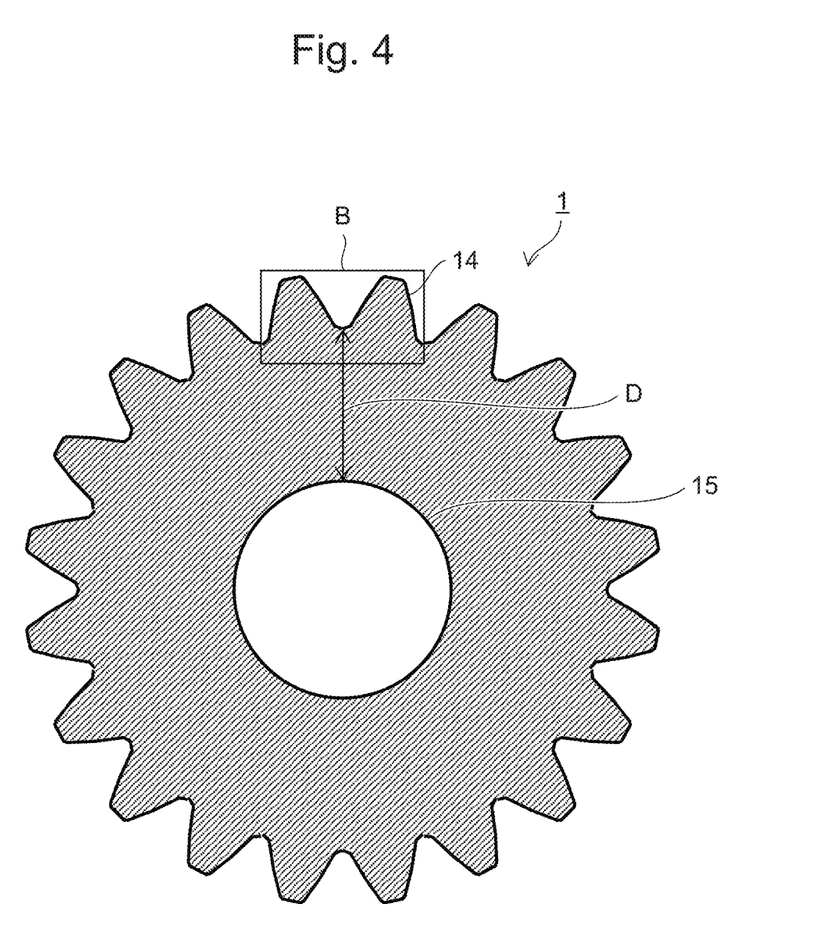
FIG. 4 is a radial cross sectional view of the gear component according to an embodiment of the present invention.

FIG. 4 is a radial cross sectional view (the X-X' cross sectional view of FIG. 2) of the gear component 1. The distance between the tooth section 14 and the inner pore 15 is the rim thickness D.

Figure 5:
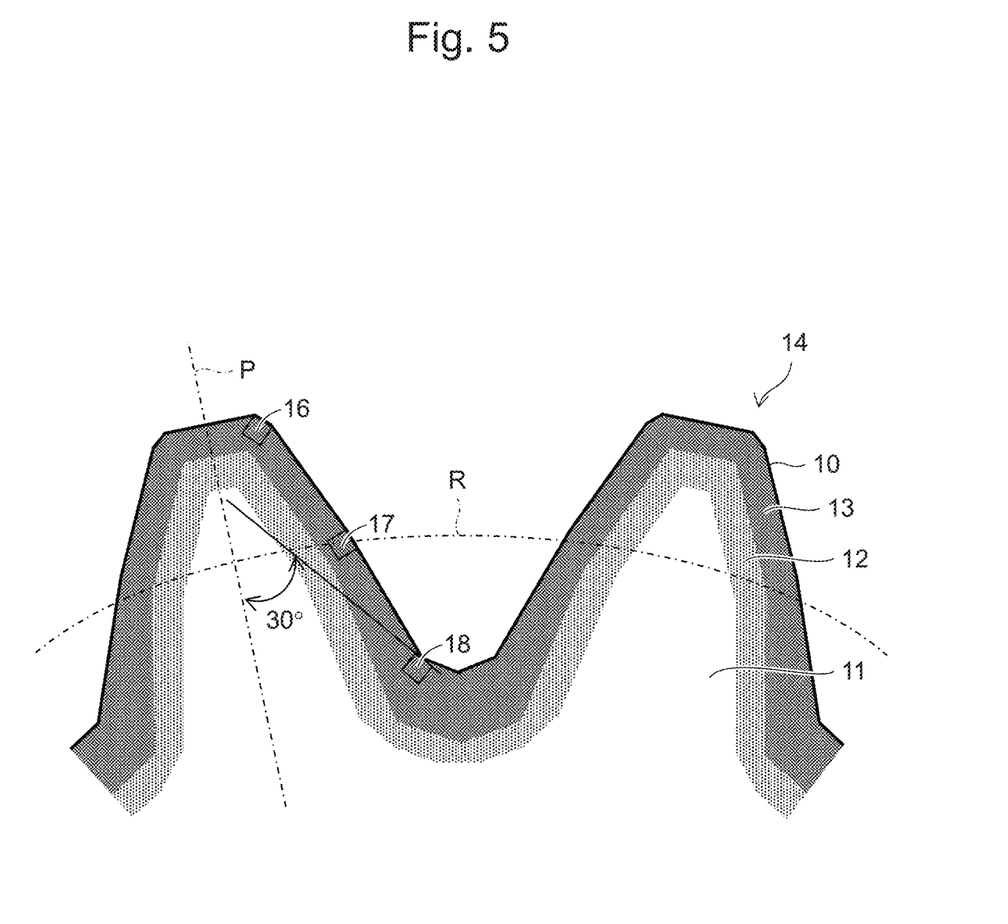
FIG. 5 is an enlarged view of a part B shown in FIG. 4.

FIG. 5 is an enlarged view of a part B shown in FIG. 4. As shown in the enlarged view of the axial cross section of the gear component 1 in FIG. 3, the tooth section 14 comprises the mother phase 11, the carburized layer 12, and the carbide layer 13 formed in that order from the core part toward the surface 10 of the gear component 1. An area including a tip section of the tooth section 14 is the tooth tip 16, and an area including the point of intersection between the surface 10 and the pitch circle R is the tooth surface 17. An area including a point of contact between a line that makes a 30-degree angle with the center line P of the tooth section 14 and the surface 10 is the tooth root (tooth bottom) 18. Specifically, the tooth section 14 comprises the tooth root 18, the tooth tip 16, and the tooth surface 17 between the tooth root 18 and the tooth tip 16.

In the surface layer of the tooth root 18; i.e., the carbide layer 13 of the tooth root 18, the area percentage of carbides in at least a part thereof is 10% or lower, and the number density of carbides is 6 pieces/10 µm² or lower. Concerning the carbide layer 13 of the tooth root 18, the area percentage of carbides exceeding 10% results in the lowered concentration of an alloying element, such as chromium, in the mother phase, the lowered hardenability, and the lowered hardness. As a consequence, the bending fatigue strength of the tooth root 18 is deteriorated. The number density of carbides exceeding 6 pieces/10 µm² results in the increased surface area at the interface between the carbides and the mother phase, the structure with hardness lower than that of the martensite is likely to be formed during hardening, and the bending fatigue strength of the tooth root 18 is then deteriorated.

In the surface layer on the tooth surface 17; i.e., the carbide layer 13 on the tooth surface 17, the area percentage of carbides in at least a part thereof is preferably 10% or lower. When the area percentage of carbides exceeds 10% in the carbide layer 13 on the tooth surface 17, coarse carbides are likely to cause and spread cracks while the gear is operated. This may shorten the pitting fatigue life of the tooth surface.

The area percentage of carbides in the carbide layer 13 on the tooth surface 17 is preferably larger than the area percentage of carbides in the carbide layer 13 of the tooth root 18. As the area percentage of carbides in the carbide layer 13 on the tooth surface 17 becomes smaller, the effects of the carbides on the tooth surface 17 for improving the pitting fatigue life becomes smaller. When the area percentage of carbides becomes larger in the carbide layer 13 of the tooth root 18, in contrast, the concentration of an alloying element, such as chromium, in the mother phase of the tooth root 18 is lowered, the hardenability is lowered, and hardness is lowered. This deteriorates the bending fatigue strength of the tooth root 18. When the area percentage of carbides of the surface layer on the tooth surface 17 becomes smaller or when the area percentage of carbides in the surface layer of the tooth root 18 becomes larger and the area percentage of carbides of the surface layer on the tooth surface 17 becomes equivalent to or lower than the area percentage of carbides in the surface layer of the tooth root 18, accordingly, the durability of the entire gear may be deteriorated.

Thickness of the carbide layer 13 of the tooth root 18 is preferably larger than thickness of the carbide layer 13 on the tooth surface 17 and the tooth tip 16. Thickness of the carbide layer 13 on the tooth surface 17, the tooth tip 16, or the tooth root 18 is thickness of the carbide layer 13 measured in the direction perpendicular to the surface of the tooth surface 17, the tooth tip 16, or the tooth root 18. On the tooth surface 17, the interior-inclusion-induced pitting fatigue damage is generated at the depth where the shear stress becomes maximal. Accordingly, the carbide layer 13 may be located at a level lower than the depth where the shear stress becomes maximal, and the carbide layer 13 may not be thick. As the thickness of the carbide layer 13 of the tooth root 18 is increased, in contrast, the residual stress of the tooth root 18 is increased, and the bending fatigue strength of the tooth root is improved. When thickness of the carbide layer 13 of the tooth root 18 is larger than thickness of the carbide layer 13 on the tooth surface 17 and thickness of the carbide layer 13 of the tooth tip 16, accordingly, the durability of the entire gear is improved.

Subsequently, a method for producing the gear component according to an embodiment of the present invention is described with reference to the figures.

Figure 6:
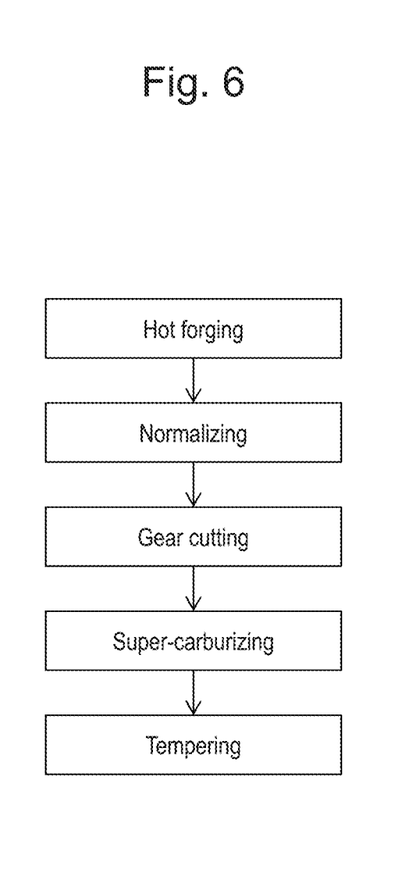
FIG. 6 shows a step of producing the gear component according to an embodiment of the present invention.

FIG. 6 shows a step of producing the gear component according to an embodiment of the present invention. In order to prepare a gear component with an adequate dimension, at the outset, the steel material having the element composition described above is adequately subjected to hot forging and then to normalizing, so as to eliminate the influence of the processed structure and the distortion due to processing. The resultant is then subjected to gear cutting in the form of a gear and then to surface hardening by super-carburizing and tempering. According to need, finish processing may be performed after the tempering, so as to reduce the distortion due to heat treatment.

Figure 7:
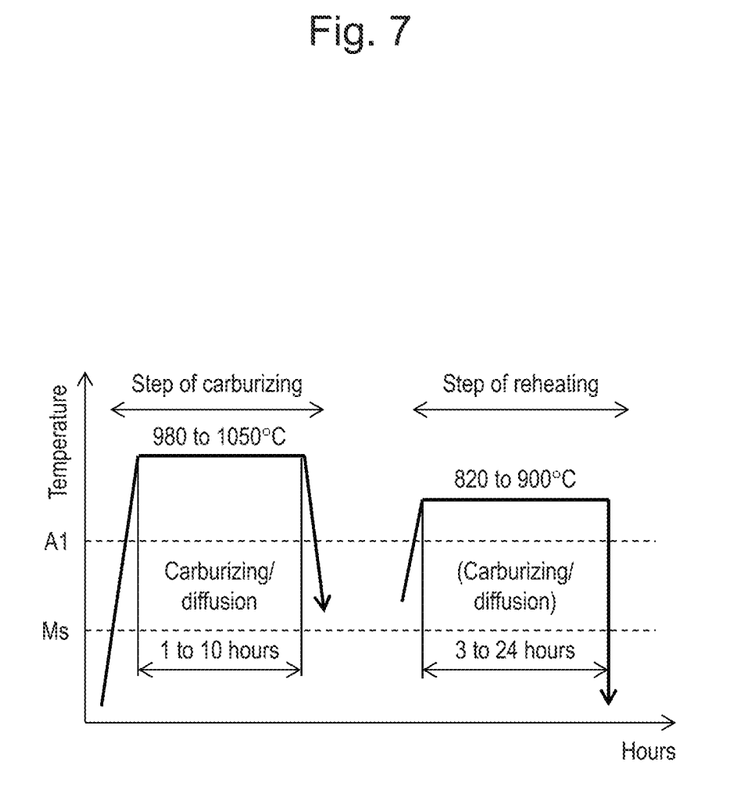
FIG. 7 shows the outline of the step of the super-carburizing treatment.

FIG. 7 shows the outline of the step of the super-carburizing treatment. Hereafter, the step of the super-carburizing treatment performed when producing the gear component according to an embodiment of the present invention is described with reference to FIG. 7. As shown in FIG. 7, the step of the super-carburizing treatment comprises a step of carburizing and a step of reheating.

In the step of carburizing, the gear component 1 is soaked, and hydrocarbon gas, such as acetylene, is introduced intermittently for a given period of time. Thus, carbon is introduced into the material from the surface thereof and diffused therein to form the carburized layer 12 and the carbide layer 13. The step of carburizing is performed at a temperature equivalent to or higher than the A1 transformation temperature. When the step of carburizing is performed at a temperature lower than the A1 transformation temperature, the structure would not be transformed into austenite, and it would not be carburized. As the step of carburizing is performed at a higher temperature, the duration of carburizing is shortened, although the distortion due to heat treatment becomes larger. It is accordingly preferable that the step of carburizing be performed at approximately 980° C. to 1050° C. During the step of carburizing, a temperature may adequately be changed, according to need. A duration of the step of carburizing is preferably approximately 1 to 10 hours, so as to achieve thickness of the carburized layer 12 that is necessary for the gear component. When the step of carburizing is completed, the surface carbon concentration is preferably equal to or higher than the eutectoid carbon concentration, and carburizing is preferably performed, so as to satisfy the condition such that the carbon concentration would be lower than the carbon concentration corresponding to the Acm line at the temperature in the step of carburizing. By adjusting the surface carbon concentration to a level equivalent to or higher than the cutectoid carbon concentration, carbides are diffused in the carbide layer 13 after the step of reheating. With the aid of such carbides, the bending fatigue strength and the pitting fatigue life are improved. When the surface carbon concentration is equivalent to or higher than the carbon concentration corresponding to the Acm line at the temperature in the step of carburizing, coarse carbides are precipitated along the prior austenite grain boundaries during the step of carburizing. Since the coarse carbides precipitated along the grain boundaries remain after the step of reheating, the hardenability is deteriorated, and hardness of the tooth root is lowered. When the surface carbon concentration upon completion of the step of carburizing is higher, the area percentage of carbides after the step of reheating is increased, the hardenability is lowered, and hardness of the tooth root after the step of reheating is lowered. Thus, such surface carbon concentration is preferably between 1.0 wt % and 2.0 wt %. In the step of carburizing, a cooling rate is not particularly limited, provided that the carbon concentration is maintained in the oversaturated state during cooling and coarse carbides would not be formed in the subsequent step of reheating. A temperature after cooling in the step of carburizing should be lower than the A1 point. When a temperature after cooling in the step of carburizing is equivalent to or higher than the A1 point, austenite would not be transformed into pearlite, and carbides would not be diffused in the carbide layer 13 in the step of reheating.

In the step of reheating, the gear component 1 is soaked, and hydrocarbon gas, such as acetylene, is introduced intermittently for a given period of time. Thus, carbon is introduced into the material from the surface thereof and diffused therein for hardening. Thus, carbides, mainly, the nuclei of carbides in the carbide layer 13 formed during cooling in the step of carburizing and during heating and soaking in the step of reheating, are regulated to have the area percentage and the number density that are necessary to improve hardness of the tooth root. Following the hardening, accordingly, the gear component 1 with high hardness of the tooth root can be obtained. If the carbides in the carbide layer 13 obtained at the oversaturated carbon concentration after the step of carburizing can satisfy the conditions of the area percentage and the number density of the carbides, acetylene or the like may not be introduced in the step of reheating. The step of reheating is preferably performed at a temperature equivalent to or higher than the A1 transformation temperature, and more preferably at a temperature lower than the Acm temperature at the surface carbon concentration upon completion of the step of reheating. When the step of reheating is performed at a temperature lower than the A1 transformation temperature, the structure would not be transformed into austenite, and the gear component 1 would not be hardened during the process of hardening. When the step of reheating is performed at a temperature equivalent to or higher than the Acm temperature at the surface carbon concentration of the component upon completion of the step of reheating, carbides precipitated in the carbide layer 13 would form a solid solution. As the temperature in the step of reheating is increased, the number density of carbides in the carbide layer 13 is decreased. Since the amount of the austenite remaining after hardening is increased and the hardness is lowered, the temperature is preferably approximately 820° C. to 900° C. A duration of the step of reheating is preferably longer than a duration of reheating that is generally employed, such as approximately for 3 to 24 hours, so as to allow the carbides in the carbide layer 13 to undergo Ostwald ripening and satisfy the conditions of the area percentage and the number density of carbides. In order to regulate the structure, according to need, a temperature may be adequately changed during processing, and a process of cooling and heating may be adequately added. The temperature after hardening in the step of reheating should be lower than the Ms point. If the temperature after hardening in the step of reheating is equivalent to or higher than the Ms point, austenite would not be transformed into martensite, and the material would not be hardened.

In the step of tempering after the step of the super-carburizing treatment, a temperature is adequately set within the range from 150° C. to 250° C. to soak the gear component 1. A duration of treatment is not particularly limited, and a method of cooling is not particularly limited, provided that the gear component 1 is soaked.

EXAMPLES

Hereafter, the present invention is described in greater detail with reference to the examples and the comparative examples.

Figure 8:
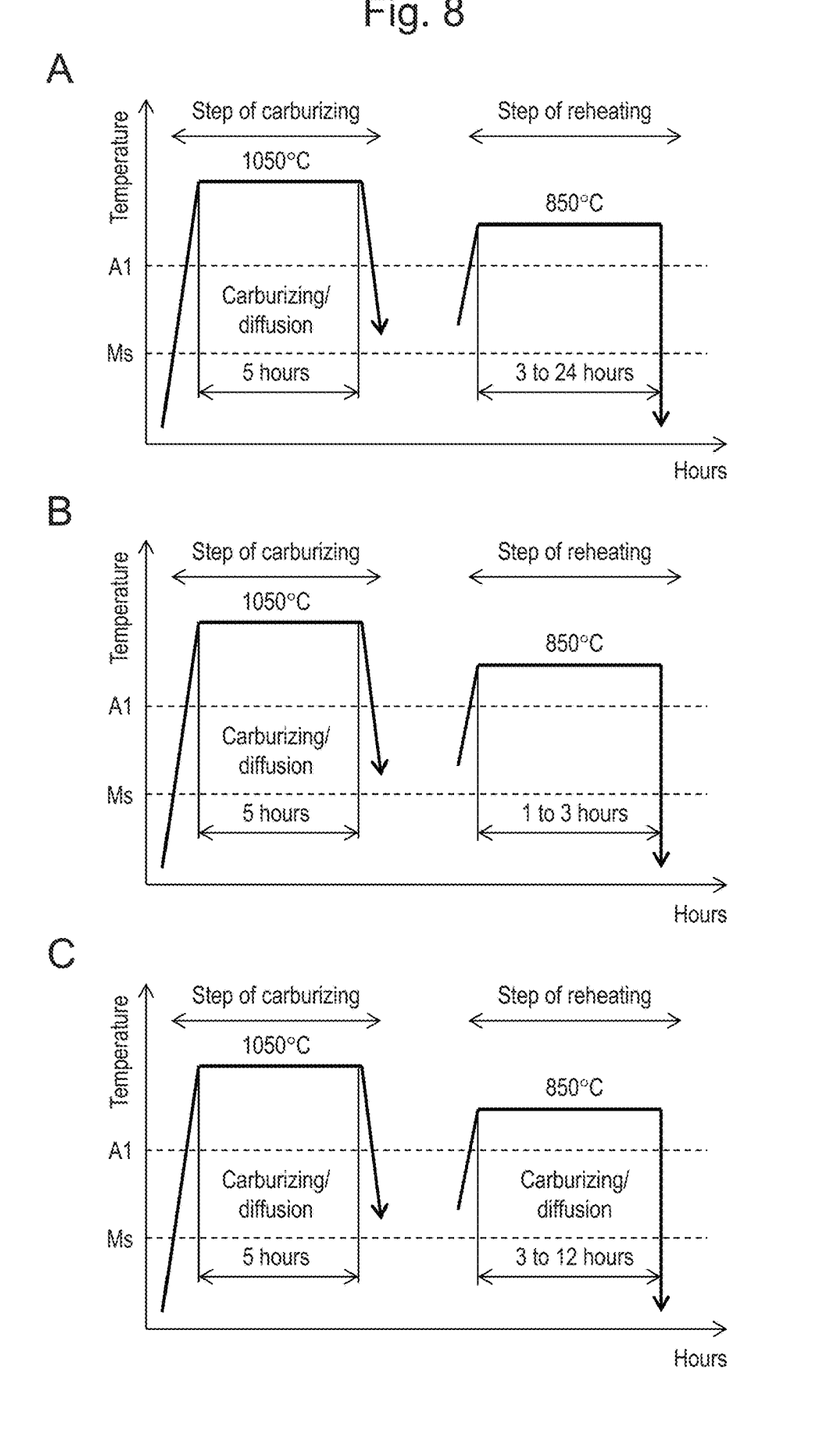
FIG. 8 shows the outline of the step of the super-carburizing treatment performed in the examples and the comparative examples.
Figure 9:
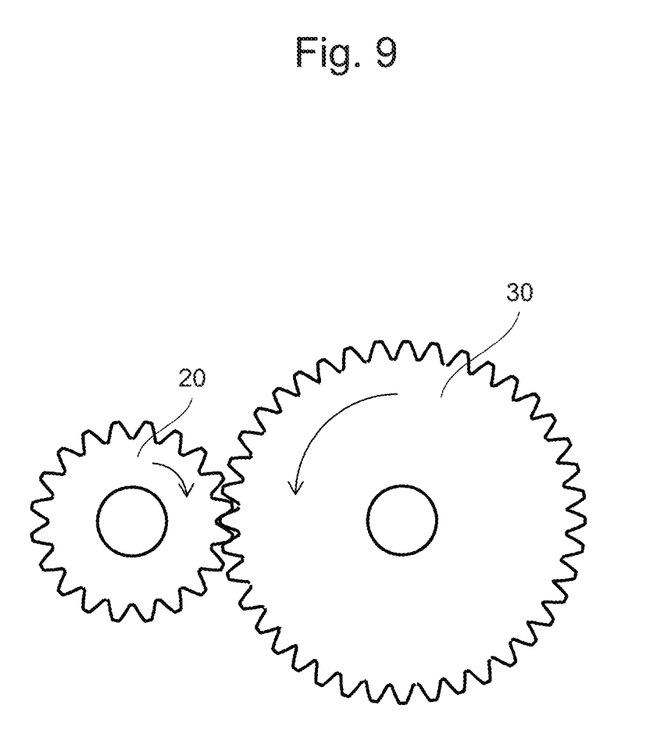
FIG. 9 shows the configurations of test pieces used in the tooth surface fatigue tests performed in the examples and the comparative examples.

As shown in Table 1, the gear components 1 of Examples 1 to 3 and Comparative Examples 1 to 5 were prepared by changing the super-carburizing treatment conditions and the rim thickness D. FIG. 8 shows the outline of the step of super-carburizing treatment in the examples and the comparative examples. The area percentage of carbides and the number density of carbides of the tooth surface 17 and the tooth root 18 were determined with the use of image analysis software by subjecting the radial cross section of the gear component as shown in FIG. 4 to etching in sodium picrate heated to 80° C. for 20 minutes and selectively allowing carbides to appear in black. The hardness ratio of the tooth tip 16, the tooth surface 17, and the tooth root 18 was determined by dividing the value obtained by testing the radial cross section of the gear component shown in FIG. 4 using the Vickers hardness tester by the value obtained by testing the eutectoid-carburized gear component. The fatigue life of the tooth surface was evaluated by an element test simulating the tooth surface fatigue; i.e., the tooth surface fatigue test. FIG. 9 shows the configurations of test pieces used in the tooth surface fatigue tests performed in the examples and the comparative examples. The small gear 20 was prepared by subjecting the steel material of the element composition described above to hot forging, normalizing, gear cutting, super-carburizing shown in Table 1, and tempering. The large gear 30 was prepared by subjecting the steel material of the element composition described above to hot forging, normalizing, gear cutting, eutectoid carburizing, and tempering. The tooth surface fatigue test was performed by meshing the small gear 20 with the large gear 30 and testing the meshed gears with the use of a gear reducer lubricant oil at 70° C. with the hertz contact pressure of 230 kgf/mm$^2$. The tooth surface fatigue life was evaluated based on the number of cycles of the small gear 20 before the pitting fatigue damage appeared on the tooth surface of the small gear 20. The ratio of the tooth surface fatigue life was determined by dividing the value indicating the tooth surface fatigue life of the super-carburized small gear 20 by the value indicating the tooth surface fatigue life of the eutectoid-carburized small gear 20. In Table 1, the symbol "*" indicates that the surface layer of the tooth root or the tooth surface includes a region where the area percentage of carbides is higher than 10% or a region where the number density of carbides of the tooth root is higher than 6 pieces/10 μm$^2$.

In Examples 1 to 3, the gear component 1 with the rim thickness D of 50 mm or 120 mm was treated under the super-carburizing treatment conditions shown in FIG. 8A while regulating the duration of the step of reheating within a range of 3 to 24 hours. Thus, the surface layer of the tooth root was regulated to include a region in which the area percentage of carbides would be 10% or lower and the number density of carbides would be 6 pieces/10 μm$^2$ or lower, and the surface layer on the tooth surface was regulated to include a region in which the area percentage of carbides would be 10% or lower.

In Comparative Examples 1, 2, 4, and 5, the gear component 1 with the rim thickness D of 50 mm or 120 mm was treated under the super-carburizing treatment conditions shown in FIG. 8B while regulating the duration of the step of reheating within a range of 1 to 3 hours. Thus, the surface layer of the tooth root was regulated to include a region in which the area percentage of carbides would be higher than 10% or the number density of carbides would be higher than 6 pieces/10 μm$^2$. In Comparative Example 4, in addition, the surface layer on the tooth surface was regulated to include a region in which the area percentage of carbides would be higher than 10%.

In Comparative Example 3, the gear component 1 with the rim thickness of 50 mm was treated under the super-carburizing treatment conditions shown in FIG. 8C while regulating the duration of the step of reheating within a range of 3 to 12 hours and introducing hydrocarbon gas intermittently for a given period of time in the step of reheating. Thus, the surface layer of the tooth root and that of the tooth surface were each regulated to include a region in which the area percentage of carbides would be higher than 10%.

Figure 10:
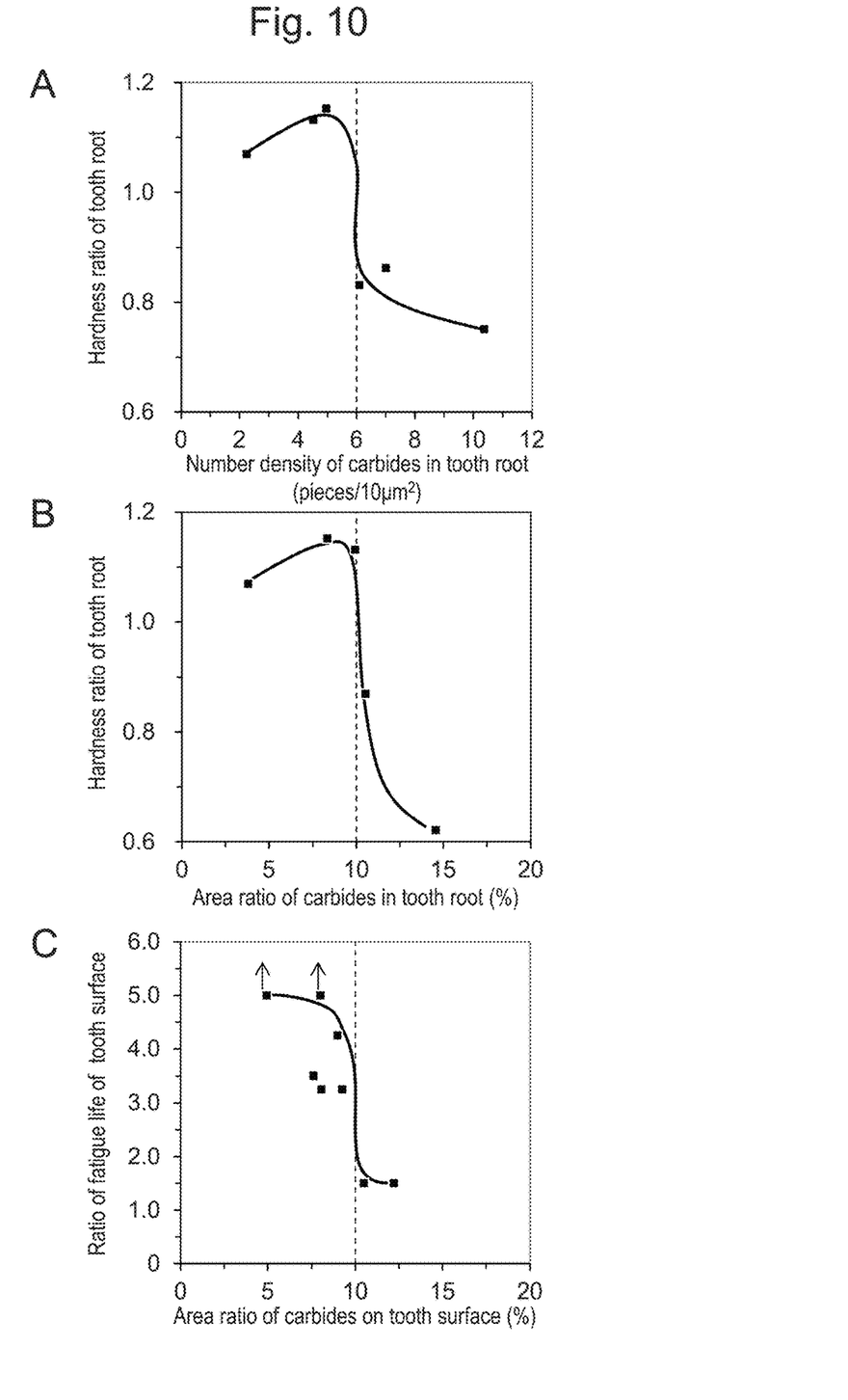
FIG. 10 shows charts demonstrating the correlation between the structure and the properties of materials tested in the examples and the comparative examples.

FIG. 10 shows charts demonstrating the correlation between the structure and the properties of materials tested in the examples and the comparative examples. FIG. 10A shows the correlation between the number density of carbides in the tooth root and the hardness ratio of the tooth root, and the correlation of the gear components of the examples and the comparative examples shown in Table 1 exhibiting the area percentage of carbides in the tooth root of 10% or lower is plotted. The hardness ratio of the tooth root begins to significantly change at the number density of carbides of 6 pieces/10 μm$^2$ in the tooth root. FIG. 10B shows the correlation between the area percentage of carbides in the tooth root and the hardness ratio of the tooth root, and the correlation of the gear components of the examples and the comparative examples shown in Table 1 exhibiting the number density of carbides in the tooth root

TABLE 1

| | Condition | Rim thickness (mm) | Number density of carbides in tooth root (pieces/10 μm$^2$) | Area ratio of carbides in tooth root (%) | Area ratio of carbides on tooth surface (%) | Hardness ratio of tooth tip | Hardness ratio of tooth surface | Hardness ratio of tooth root | Ratio of fatigue life of tooth surface |
|---|---|---|---|---|---|---|---|---|---|
| Ex. 1 | a | 50 | 2.2 | 3.8 | 5.0 | 1.2 | 1.1 | 1.1 | >5.0 |
| Ex. 2 | a | 50 | 4.5 | 9.9 | 7.6 | 1.1 | 1.1 | 1.1 | 3.5 |
| Ex. 3 | a | 120 | 5.0 | 8.3 | 8.0 | 1.2 | 1.2 | 1.2 | >5.0 |
| Comp. Ex. 1 | b | 50 | *10.4 | 9.1 | 8.1 | 1.2 | 1.2 | 0.8 | 3.3 |
| Comp. Ex. 2 | b | 50 | *7.0 | 9.5 | 9.3 | 1.2 | 1.1 | 0.9 | 3.3 |
| Comp. Ex. 3 | c | 50 | 1.8 | *14.6 | *12.2 | 1.1 | 1.1 | 0.6 | 1.5 |
| Comp. Ex. 4 | b | 120 | 5.2 | *10.5 | *10.5 | 1.2 | 1.2 | 0.9 | 1.5 |
| Comp. Ex. 5 | b | 120 | *6.1 | 8.1 | 9.0 | 1.2 | 1.4 | 0.8 | 4.3 | of 6 pieces/10 μm² or lower is plotted. The hardness ratio of the tooth root begins to significantly change at the area percentage of carbides of 10% in the tooth root. FIG. 10C shows the correlation between the area percentage of carbides in the tooth surface and the ratio of the fatigue life of the tooth surface. The ratio of the fatigue life of the tooth surface begins to significantly change at the area percentage of carbides of 10% on the tooth surface.

The present invention is not limited to the examples described above, and the present invention can be implemented with various modifications performed within the scope of the present invention. In at least a part of the carbide layer 13 of the tooth root 18, for example, the area percentage of carbides may be 10% or lower and the number density of carbides may be 6 pieces/10 μm² or lower.

REFERENCE SIGNS LIST

1: Gear component
10: Surface
11: Mother phase
12: Carburized layer
13: Carbide layer
14: Tooth section
15: Inner pore
16: Tooth tip
17: Tooth surface
18: Tooth root
20: Small gear
30: Large gear
D: Rim thickness
R: Pitch circle
W: Tooth width
P: Center line All publications, patents, and patent applications cited herein are incorporated herein by reference in their entirety.

The invention claimed is:

1. A gear component comprising a tooth section having a tooth root, a tooth tip, and a tooth surface between the tooth root and the tooth tip and consisting of a super-carburized steel material,
    wherein the tooth root, the tooth surface, and the tooth tip each have a carbide layer comprising carbides diffused and deposited on a surface layer,
    the area percentage of carbides is 10% or lower and the number density of carbides is 6 pieces/10 μm² or lower in at least a part of the carbide layer of the tooth root, and
    thickness of the carbide layer of the tooth root is larger than thickness of the carbide layer of the tooth surface and thickness of the carbide layer of the tooth tip.

2. The gear component according to claim 1, wherein the area percentage of carbides is 10% or lower in at least a part of the carbide layer of the tooth surface.

3. The gear component according to claim 1, wherein the area percentage of carbides in the carbide layer on the tooth surface is larger than the area percentage of carbides in the carbide layer of the tooth root.

* * * * *